(12) United States Patent
Yoshikawa (10) Patent No.: US 11,884,271 B2
(45) Date of Patent: Jan. 30, 2024

(54) VEHICLE DRIVING SUPPORT DEVICE

(71) Applicant: SUBARU CORPORATION, Tokyo (JP)

(72) Inventor: Hikaru Yoshikawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 124 days.

(21) Appl. No.: 17/550,079

(22) Filed: Dec. 14, 2021

(65) Prior Publication Data
US 2022/0194370 A1    Jun. 23, 2022

(30) Foreign Application Priority Data
Dec. 23, 2020    (JP) .................. 2020-213448

(51) Int. Cl.
*B60W 30/12* (2020.01)
*B60W 40/04* (2006.01)
(Continued)

(52) U.S. Cl.
CPC ............ *B60W 30/12* (2013.01); *B60W 40/04* (2013.01); *B60W 50/087* (2013.01); *B60W 50/12* (2013.01); *B60W 50/14* (2013.01); *B60W 2050/146* (2013.01); *B60W 2520/10* (2013.01); *B60W 2540/10* (2013.01);
(Continued)

(58) Field of Classification Search
CPC .......... B60Q 1/38; B60Q 1/535; B60Q 9/008; B60W 30/0956; B60W 30/12; B60W 30/18163; B60W 40/04; B60W 50/087; B60W 50/12; B60W 50/14; B60W 50/16; B60W 2050/146; B60W 2420/42; B60W 2520/10; B60W 2540/10; B60W 2540/18; B60W 2540/20; B60W 2552/50; B60W 2552/53; B60W 2554/4041; B60W 2554/4049; B60W 2554/801; B60W 2554/802; B60W 2554/804
See application file for complete search history.

(56) References Cited

U.S. PATENT DOCUMENTS

| 2005/0017858 A1* | 1/2005 | Gross .................... B60Q 9/008 340/435 |
| 2018/0370543 A1* | 12/2018 | Poeppel ................. B60K 35/00 |
| 2021/0380112 A1* | 12/2021 | Oh ........................ B60W 50/14 |

FOREIGN PATENT DOCUMENTS

JP    2016-71514 A    5/2016

* cited by examiner

*Primary Examiner* — Peter D Nolan
*Assistant Examiner* — Ce Li Li
(74) *Attorney, Agent, or Firm* — TROUTMAN PEPPER HAMILTON SANDERS LLP (57) ABSTRACT

A vehicle driving support device includes a turn-signal switch switched on by a driver of the vehicle in the vehicle's course change, a rear side detector that detects an approaching vehicle on a lane to which the course of the vehicle is to be changed, turn-signal lamps on the right and left sides of the vehicle, and a turn-signal display processor displaying one of the turn-signal lamps which is on the side of the lane when the turn-signal switch is on. The turn-signal display processor includes a closeness determiner that determines whether the approaching vehicle is close to the vehicle when the turn-signal switch is on and the rear side detector detects the approaching vehicle, and a standby-state processor that, if that the approaching vehicle is close to the vehicle, causes the one of the turn-signal lamps to be a standby state and informs the driver of the standby state.

6 Claims, 5 Drawing Sheets

(51) Int. Cl.
*B60W 50/08* (2020.01)
*B60W 50/12* (2012.01)
*B60W 50/14* (2020.01)
*G08G 1/16* (2006.01)

(52) U.S. Cl.
CPC ..... *B60W 2540/18* (2013.01); *B60W 2540/20* (2013.01); *B60W 2554/4041* (2020.02); *B60W 2554/4049* (2020.02)

VEHICLE DRIVING SUPPORT DEVICE

CROSS-REFERENCE TO RELATED APPLICATION

The present application claims priority from Japanese Patent Application No. 2020-213448 filed on Dec. 23, 2020, the entire contents of which are hereby incorporated by reference.

BACKGROUND

The disclosure relates to a vehicle driving support device which causes, even if a driver who is going to make a lane change switches on a turn-signal switch, lighting of turn-signal lamps to stand by if a following vehicle, which is approaching on the adjacent lane to which the lane change is to be made, is detected.

When a driver, who is driving a vehicle, is to cause the vehicle to make a lane change, the driver first switches on a turn-signal switch to light turn-signal lamps on the lane change side. Thus, the driver causes the intention of making a lane change to be known to following vehicles traveling on the lane, on which the vehicle is traveling, and to following vehicles traveling on the lane to which the vehicle is to make the lane change.

Some recent known vehicle driving support devices include an auto lane changing (ALC) control function in which the system recognizes the driver's intention to make a lane change and starts the lane change at an appropriate timing. There are two types of such ALC control, that is, driver-instruction ALC control and driver-approval ALC control. In the driver-instruction ALC control, a driver, who is going to make a lane change, switches on a turn-signal switch to instruct the system to make the lane change, and the system thus starts the lane change. In the driver-approval ALC control, the system proposes a lane change to a driver, and the system starts the lane change with the driver's approval.

As driver-approval ALC control, for example, Japanese Unexamined Patent Application Publication No. 2016-71514 discloses the following technique in which if a driver does not operate a turn signal lever until a given time has elapsed after the system proposes a lane change, the system determines that the driver agrees with the lane change, and turns on signal lamps on the lane change side; and if the driver operates the turn signal lever in the given time period, the system determines that the driver does not agree with (cancels) the proposal for a lane change, and does not turn on the turn-signal lamps.

SUMMARY

An aspect of the disclosure provides a vehicle driving support device to be applied to a vehicle. The vehicle driving support device includes a turn-signal switch, a rear side detector, turn-signal lamps, and a turn-signal display processor. The turn-signal switch is to be switched on by a driver who drives the vehicle, in a case where a course of the vehicle is to be changed. The rear side detector is configured to detect an approaching vehicle traveling on a lane to which the course of the vehicle is to be changed. The turn-signal lamps are to be respectively disposed on the right and left sides of the vehicle in the width direction of the vehicle. One of the turn-signal lamps on a side of the lane is to be turned on in a case where the course of the vehicle is to be changed. The turn-signal display processor is configured to perform display processing regarding the one of the turn-signal lamps in response to the turn-signal switch being switched on. The turn-signal display processor includes a closeness determiner and a standby-state processor. The closeness determiner is configured to determine whether the approaching vehicle is close to the vehicle based on the relationship between the vehicle and the approaching vehicle, in a case where the rear side detector detects the approaching vehicle when the turn-signal switch is switched on. In a case where the closeness determiner determines that the approaching vehicle is close to the vehicle, the standby-state processor is configured to cause the one of the turn-signal lamps to be a standby state in which turning the one of the turn-signal lamps on is prohibited, and inform the driver of the standby state.

An aspect of the disclosure provides a vehicle driving support device to be applied to a vehicle. The vehicle driving support device includes a turn-signal switch, a rear side sensor, turn-signal lamps, and circuitry. The turn-signal switch is to be switched on by a driver who drives the vehicle, in a case where a course of the vehicle is to be changed. The rear side sensor is configured to detect an approaching vehicle traveling on a lane to which the course of the vehicle is to be changed. The turn-signal lamps are to be respectively disposed on the right and left sides of the vehicle in the width direction of the vehicle. One of the turn-signal lamps on a side of the lane is to be turned on in the case where the course of the vehicle is to be changed. The circuitry is configured to perform display processing regarding the one of the turn-signal lamps in response to the turn-signal switch being switched on. The circuitry is configured to determine whether the approaching vehicle is close to the vehicle based on the relationship between the vehicle and the approaching vehicle, in a case where the rear side sensor detects the approaching vehicle when the turn-signal switch is switched on. Upon determining that the approaching vehicle is close to the vehicle, the circuitry is configured to cause the one of the turn-signal lamps to be a standby state in which turning the one of the turn-signal lamps on is prohibited, and inform the driver of the standby state.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In an automatic lane change under auto lane changing (ALC) control provided by a system, turn-signal lamps on the lane change side are to be turned on to inform following vehicles of an intention to make a lane change.

In this case, as a matter of course, the ALC control checks if a following vehicle (an approaching vehicle), which is coming closer, has been detected on the lane to which a lane change is to be made. When an approaching vehicle has been detected, the lane change is not started until the approaching vehicle has passed. After the approaching vehicle has passed, the lane change is started.

Even in this state, in the ALC control, a vehicle under the ALC control waits for the approaching vehicle to pass, with the turn-signal lamps on the lane change side being turned on. If the turn-signal lamps of the vehicle are suddenly turned on immediately after the approaching vehicle comes close to the vehicle, the driver of the approaching vehicle, who worries about a collision, may be in panic.

In contrast, when, without the turn-signal lamps being turned on, the vehicle waits for the approaching vehicle to pass, the driver of the vehicle may mistakenly believe that the turn-signal lamps have been automatically turned off because the approaching vehicle is close to the vehicle. When the turn-signal lamps are turned on after the vehicle allows the approaching vehicle to pass, the driver of the vehicle may feel annoyed because the driver of the vehicle does not understand the reason why the turn-signal lamps are turned on.

It is desirable to provide a vehicle driving support device. In changing a course in driving, even when a vehicle waits for an approaching vehicle, which has been detected on the lane to which the vehicle is to make a lane change, to pass, the vehicle driving support device does not make the driver of the approaching vehicle be in panic. In addition, the vehicle driving support device does not make the driver of the vehicle feel annoyed.

Figure 5A:
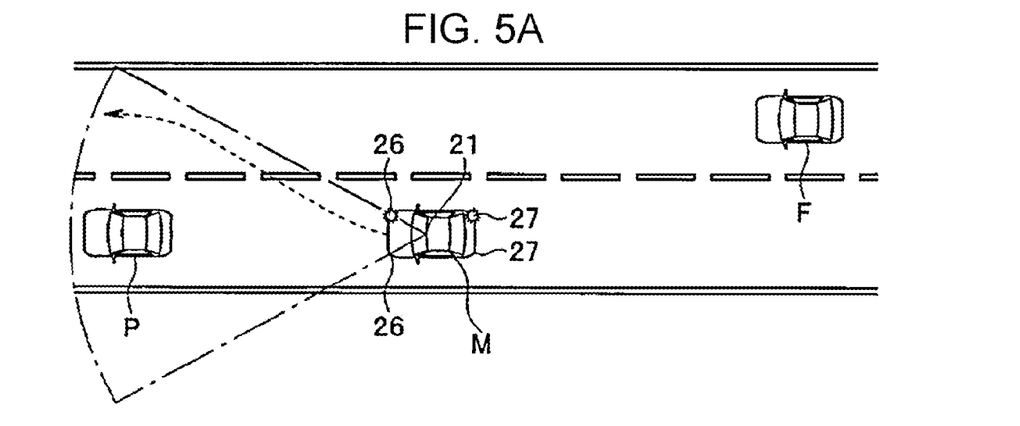
FIG. 5A is a bird's-eye view of a state of starting a lane change to the front of an approaching vehicle traveling on an adjacent lane.
Figure 5B:
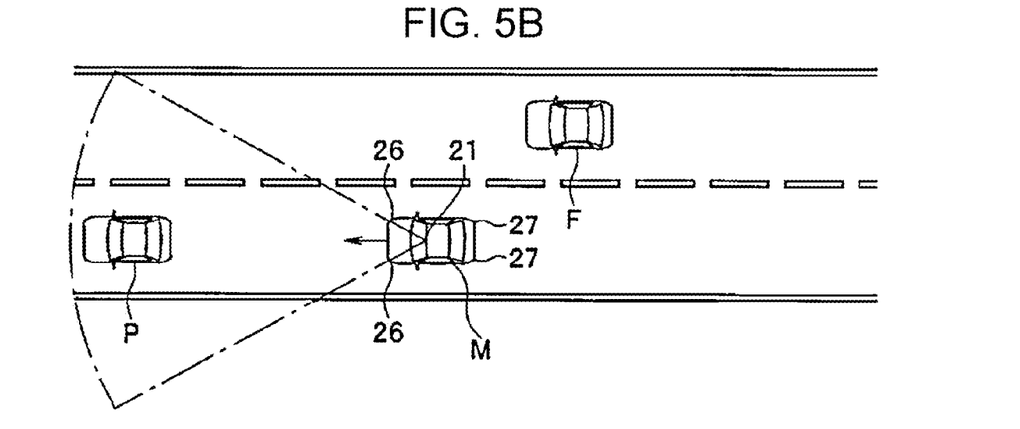
FIG. 5B is a bird's-eye view of a state of waiting for an approaching vehicle to pass.
Figure 5C:
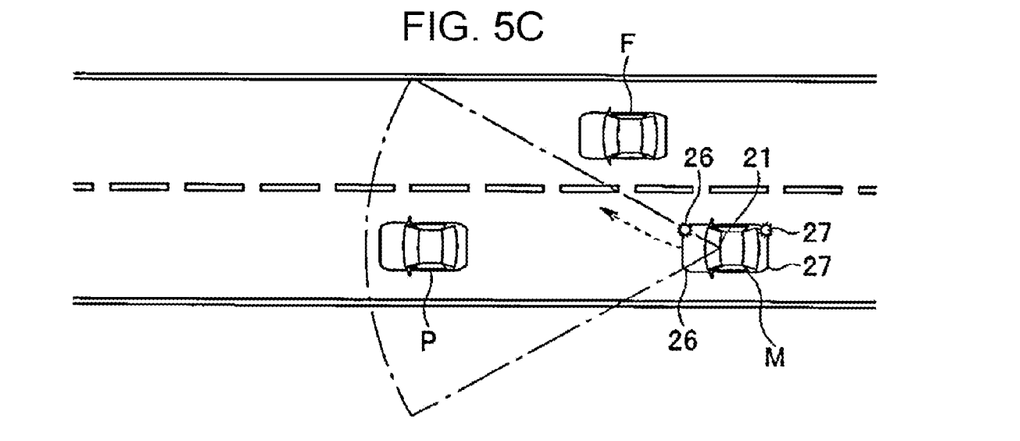
FIG. 5C is a bird's-eye view of a state of starting a lane change after an approaching vehicle has passed.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIGS. 5A to 5C illustrate a vehicle M, a leading vehicle P which travels immediately before the vehicle M, and a following vehicle (approaching vehicle) F which travels on an adjacent lane and which is approaching the vehicle M. The embodiment will be described under the assumption of left-hand traffic. In the case of right-hand traffic, the description will be made with the left and the right being reversed.

Figure 1:
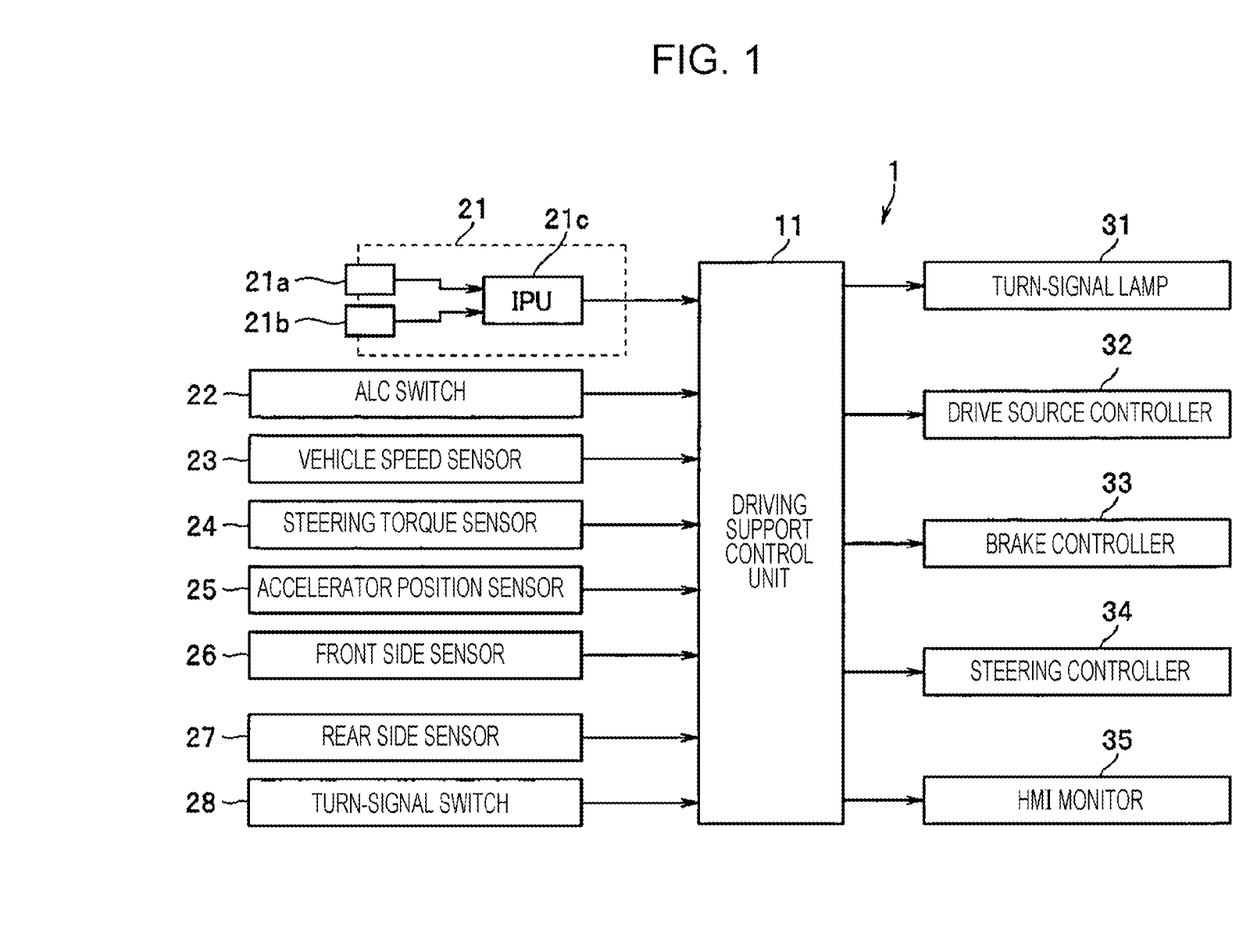
FIG. 1 is a schematic diagram illustrating the configuration of a vehicle driving support device.

A vehicle driving support device 1 illustrated in FIG. 1 is mounted in the vehicle M. The vehicle driving support device 1 includes a driving support control unit 11. The driving support control unit 11 includes a microcomputer including a central processing unit (CPU), a read-only memory (ROM), a random-access memory (RAM), and a nonvolatile memory. In the ROM, for example, control programs and fixed data, which are used to implement operations of the system, are stored.

Sensors and switches are coupled on the input side of the driving support control unit 11. The sensors and switches include a front recognizing sensor 21, an ALC switch 22 that is turned on when a driver is to select ALC control, a vehicle speed sensor 23 that detects the speed of the vehicle M, a steering torque sensor 24 that detects a torque generated by a steering wheel operation of the driver, an accelerator position sensor 25 that detects the amount of stepping on the accelerator pedal by the driver, front side sensors 26, rear side sensors 27, and a turn-signal switch 28 that is switched to the course change side when the driver is to make a course change such as a lane change while driving. In the present embodiment, an alternate switch is employed as the turn-signal switch 28. However, a momentary switch may be employed as the turn-signal switch 28. In one embodiment, the rear side sensors 27 may each serve as a "rear side detector".

The front recognizing sensor 21 includes a stereo camera, which includes a main camera 21a and a sub-camera 21b, and an image processing unit (IPU) 21c. Images of the traveling environment of the front of the vehicle, which are captured by the cameras 21a and 21b, are subjected to given image processing by the IPU 21c, and are then transmitted to the driving support control unit 11. The stereo camera is an exemplary sensor which recognizes the front traveling environment. As long as the front traveling environment is recognized, the front recognizing sensor 21 may be, instead of a stereo camera, for example, a millimeter-wave radar, an acoustic radar, or a light detection and ranging (LiDAR) device. Alternatively, a combination of these and a monocular camera may be employed. Alternatively, a single monocular camera may be used.

The sensors 26 and 27 are, for example, cameras, millimeter-wave sensors, microwave sensors, or LiDAR devices. A pair of front side sensors 26 are disposed on the right and left sides of the front bumper. A pair of rear side sensors 27 are disposed on the right and left sides of the rear bumper. The sensors 26 monitor the right and left diagonally-forward areas, which are difficult to be recognized in the images obtained from the front recognizing sensor 21, and the sensors 27 monitor the right and left diagonally-rear areas. The driving support control unit 11 detects targets around the vehicle M based on signals from the sensors 26 and 27.

When a target travels in the same direction as that of the vehicle M, the driving support control unit 11 recognizes a target, which has been detected based on signals from the front side sensors 26, as a leading vehicle P and the driving support control unit 11 recognizes a target, which has been detected based on signals from the rear side sensors 27, as an approaching vehicle F. In addition, the driving support control unit 11 obtains the relative distance and the relative vehicle speed between the vehicle M and the leading vehicle P recognized, and the relative distance and the relative vehicle speed between the vehicle M and the approaching vehicle F recognized.

Turn-signal lamps 31, a drive source controller 32, a brake controller 33, a steering controller 34, and a human machine interface (HMI) monitor 35 and the like are coupled on the output side of the driving support control unit 11. When a course change such as a lane change is to be made, the turn-signal lamps 31 inform, through lighting, the outside of the vehicle of a direction in the course change. The turn-signal lamps 31 are disposed on the front and the rear of the vehicle body on the right side and the left side in the width direction of the vehicle M. The turn-signal lamps 31 may be light-emitting diode (LED) lamps.

The drive source controller 32 controls the output of a drive source, such as an engine or an electric motor, mounted in the vehicle M. The brake controller 33 adjusts the brake hydraulic pressures to be supplied to the brake wheel cylinders provided for the wheels, and thus controls the brake forces generated on the wheels. The steering controller 34 controls the steering torque generated by an electric power steering (EPS) motor.

The HMI monitor 35 informs, through an HMI, the driver of various types of information about a lane change. Details of the information include presence of an approaching vehicle, the relative vehicle speed and the relative position between the vehicle and the approaching vehicle, the distance from the leading vehicle, and whether it is possible to make a lane change. When a lane change is difficult to be made due to presence of an approaching vehicle, the HMI monitor 35 informs the driver of the vehicle that the turn-signal lamps 31 are in the standby state, that is, are not turned on.

Figure 2:
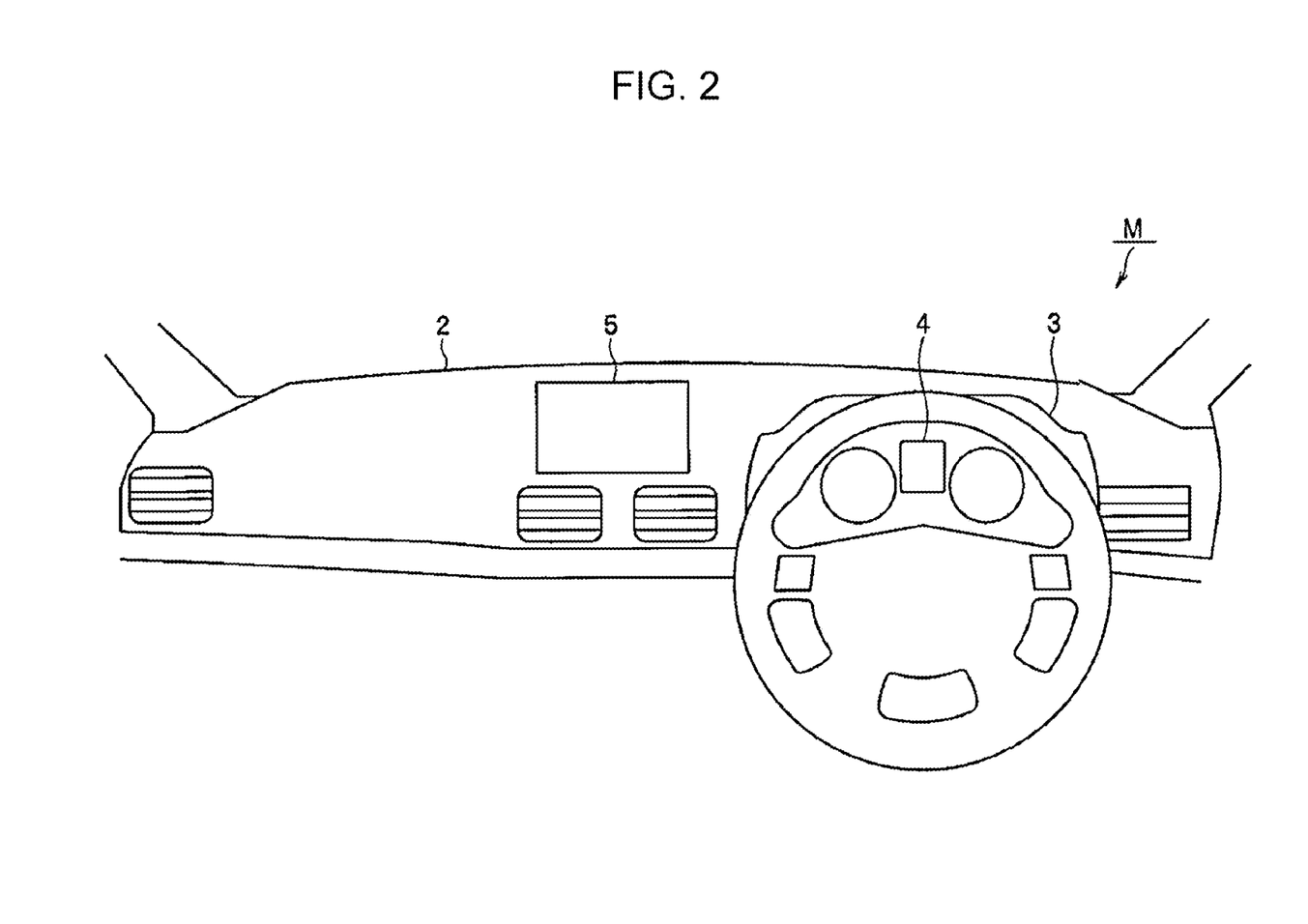
FIG. 2 is a schematic diagram illustrating an instrument panel including a human machine interface (HMI) monitor.

In the present embodiment, as illustrated in FIG. 2, a multi-information display 4 of a combination meter 3 or a navigation display device (navigation monitor) 5 of a car navigation system, each of which is disposed on an instrument panel 2, serves also as the HMI monitor 35. Although there is no illustration in FIG. 2, information to be reported to the driver is notified by sound as well as in an image displayed on the HMI monitor 35.

The driving support control unit 11 monitors approaching vehicles F, which are approaching from behind, based on signals from the rear side sensors 27 all the time. When the driver of the vehicle M switches on the turn-signal switch 28, the driving support control unit 11 calculates the timing of a lane change based on the relative distance and the relative vehicle speed between the vehicle M and an approaching vehicle F which travels on the lane to which the vehicle M is to make a course change. If the driving support control unit 11 determines that it is possible to make a lane change to the front of the approaching vehicle F, the driving support control unit 11 turns on the turn-signal lamps 31 immediately. In contrast, if the driving support control unit 11 determines that a lane change to the rear of the approaching vehicle F is to be made, the driving support control unit 11 causes the turn-signal lamps 31 to be the standby state, at least until the approaching vehicle F reaches the side-by-side position of the vehicle M. In the standby state, turning the turn-signal lamps 31 is prohibited, even when the turn-signal switch 28 is switched on.

Figure 3:
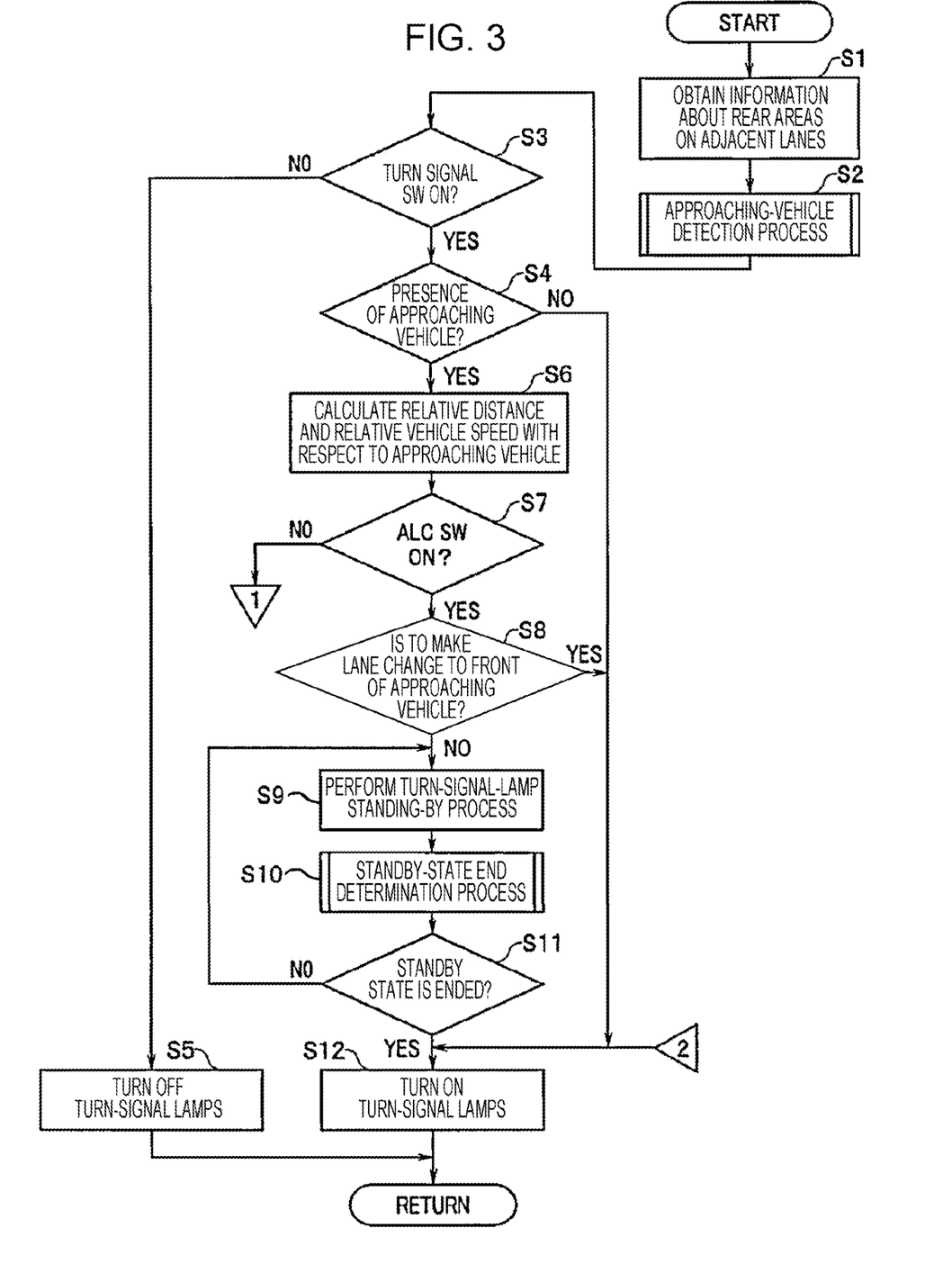
FIG. 3 is a first flowchart of a turn signal display processing routine.
Figure 4:
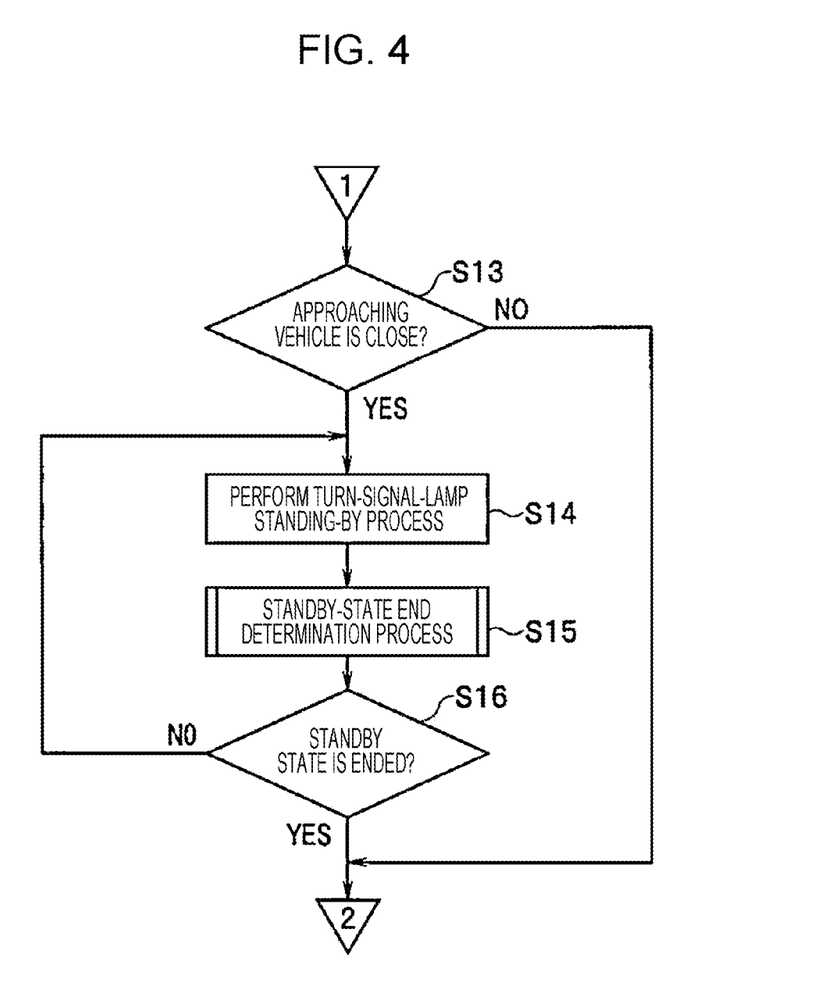
FIG. 4 is a second flowchart illustrating the turn signal display processing routine.

The display control of the turn-signal lamps 31, which is executed by the driving support control unit 11, is processed, for example, according to the turn signal display processing routine illustrated in FIGS. 3 and 4. In one embodiment of the disclosure, the process in the routine corresponds to a turn-signal display processor.

According to the routine, in step S1, information about the rear areas on the adjacent lanes is obtained based on signals from the pair of rear side sensors 27. In step S2, an approaching-vehicle detection process is performed in which it is checked, based on the information, if an approaching vehicle F is present. In the approaching-vehicle detection process, based on information about the rear areas on the adjacent lanes, it is checked if a target is traveling in the same direction as that of the vehicle M and is approaching the vehicle M based on the relative distance and the relative vehicle speed between the vehicle M and the target. If the target is traveling in the same direction as that of the vehicle M and is approaching the vehicle M, the target is presumed to be an approaching vehicle F.

In step S3, it is checked if the turn-signal switch 28 has been switched on, that is, the driver indicates an intention to make a lane change. If the turn-signal switch 28 has been switched on, the process proceeds to step S4. If the turn-signal switch 28 has been switched off, the process proceeds to step S5, the turn-signal lamps 31 are turned off or remain off, and the routine ends.

In step S4, it is checked if an approaching vehicle F has been detected in step S2 on the adjacent lane toward which the turn-signal switch 28 has been switched on. If an approaching vehicle F has been detected, the process proceeds to step S6. If an approaching vehicle F has not been detected, the process jumps to step S12.

In step S6, the relative distance and the relative vehicle speed between the approaching vehicle F, which has been detected in step S2, and the vehicle M are obtained. Alternatively, the predicted arrival time, at which the approaching vehicle F reaches the vehicle M, is obtained based on the relative distance and the relative vehicle speed through application of a time to collision (TTC) which is known.

In step S7, it is checked if the ALC switch 22 is on. If the ALC switch 22 is on, it is determined that the ALC control is being performed, and the process proceeds to step S8. If the ALC switch 22 is off, it is determined that the driver operates the steering wheel manually, and the process branches to step S13. The process in step S13 and its subsequent steps will be described below.

In step S8, based on the relative distance and the relative vehicle speed, or based on the predicted arrival time, it is checked if it is possible for the vehicle M to make a lane change to the front of the approaching vehicle F with an enough distance. In one embodiment of the disclosure, the process in this step corresponds to a closeness determiner.

If it is determined that it is possible to make a lane change to the front of the approaching vehicle F, the process jumps to step S12. For example, as illustrated in FIG. 5A, when the driver switches on the turn-signal switch 28 to pass the leading vehicle P traveling in front of the vehicle M, the ALC control tries to start making a lane change. At that time, if it is determined that the approaching vehicle F is traveling far from the vehicle M, a lane change to the front of the approaching vehicle F is made as illustrated by using the dashed arrow.

In step S8, if it is determined that a lane change to the front of the approaching vehicle F is difficult to be made, the process proceeds to step S9. At that time, as illustrated in FIG. 5B, if the ALC control determines that the approaching vehicle F is close to the vehicle M, the ALC control interrupts the lane change until the approaching vehicle F has passed.

In step S9, a turn-signal-lamp standing-by process is performed. In one embodiment of the disclosure, the process in this step corresponds to a standby-state processor.

In the turn-signal-lamp standing-by process, the turn-signal lamps 31 are made to enter the standby state. In addition, an image, which indicates that the turn-signal lamps 31 are in the standby state (are turned off), is displayed on the HMI monitor 35.

That is, if the turn-signal lamps 31 are suddenly turned on with a short distance between the vehicle M and the approaching vehicle F traveling on the adjacent lane toward which the turn-signal switch 28 is switched on, the driver of the approaching vehicle F, who worries about a collision, may be in panic. Therefore, the turn-signal lamps 31 are not turned on and enter the standby state.

In contrast, the driver of the vehicle M may mistakenly believe that a malfunction occurs, because the turn-signal lamps 31 are not turned on although the driver has switched on the turn-signal switch 28. Therefore, an image indicating the standby state is displayed on the HMI monitor 35 to reduce the driver's anxiety.

As an image which indicates the standby state and which is displayed on the HMI monitor 35, a message by characters indicating the standby state may be displayed. Some embodiments employ such display that the driver easily understands the message while viewing the front area.

For example, in some embodiments, the display formats may be as follows.

(1) The countdown time until the end of the standby state is displayed on the HMI monitor 35. The countdown time may be easily obtained from the predicted arrival time.
(2) The light color of an arrow, which indicates the course change direction to the driver and which is displayed on the HMI monitor 35, is changed from the normal light color (for example, yellow) to a different light color (for example, red).
(3) An arrow, which indicates the course change direction to the driver and which is displayed on the HMI monitor 35, is lit.
(4) How close the approaching vehicle F is to the vehicle M is displayed in a graphical view or by animation on the HMI monitor 35.
(5) In addition to (1) to (4), an audio message is delivered.

After that, the process proceeds from step S9 to step S10 in which a standby-state end determination process is performed, and the process proceeds to step S11. In the standby-state end determination process, whether to end the standby state is determined based on the positional relationship between the vehicle M and the approaching vehicle F. There may be various conditions for determining the standby-state end timing. For example, the conditions may be as follows:

(i) when the approaching vehicle F reaches the side-by-side position of the vehicle M,
(ii) when the vehicle M allows the approaching vehicle F to pass and the system then starts a lane change using the ALC control.

The standby state also ends, before the condition (i) or (ii) is satisfied, in the following state:

(iii) when the approaching vehicle F gets out of the adjacent lane to which the lane change is to be made.

Before the conditions (i) to (iii) are satisfied, when the driver performs an intentional operation, the standby state may end. The following may be examples of the driver's intentional operation.

(iv) The driver indicates an intention to make the lane change second time. For example, a sub-switch, other than the turn-signal switch 28, for compulsorily ending the standby state is disposed, and the sub-switch is turned on. Alternatively, if the turn-signal switch 28 is a momentary switch, the turn-signal switch 28 is switched on again in the same direction.
(v) The steering torque sensor 24 detects the driver's steering wheel operation in the direction toward which the lane change is to be made.
(vi) The accelerator position sensor 25 detects the driver's intentional acceleration operation. That is, for example, the driver accelerates the vehicle M to make a lane change to the front of the approaching vehicle F.

In step S11, it is checked if the standby state has been ended based on any of the conditions described above. If the standby-state end condition has not been satisfied, the process returns to step S9 and, until the standby-state end condition is satisfied, steps S9 to S11 are repeatedly performed. If the standby-state end condition is satisfied, it is determined that the standby state has been ended, and the process proceeds to step S12. In one embodiment of the disclosure, the process in steps S10 and S11 corresponds to a standby-state end determination processor.

At that time, as illustrated in FIG. 5C, if the ALC control determines that the approaching vehicle F has passed the vehicle M, the lane change is started after elapse of a given time.

In step S12, the turn-signal lamps 31 are turned on and the routine ends. The turn-signal lamps 31 on the lane change side are turned on, and the intention to make a lane change is then known to the surroundings. The driving support control unit 11 starts a lane change using the ALC control after elapse of a given time.

If it is determined that the ALC switch 22 is off (a lane change is to be manually performed) in step S7 and the process branches to the step S13, it is checked if the approaching vehicle F is close to the vehicle M based on the relative distance and the relative vehicle speed between the vehicle M and the approaching vehicle F, or based on the predicted arrival time, which are obtained in step S6. In one embodiment of the disclosure, the process in step S13 corresponds to the closeness determiner. When the driver is to switch on the turn-signal switch 28, as a matter of course, the driver recognizes whether an approaching vehicle F is present.

If the driving support control unit 11 determines that the approaching vehicle F is not close to the vehicle M, that is, the approaching vehicle F travels far from the vehicle M, the process jumps to step S12 in which the turn-signal lamps 31 are turned on immediately and the routine ends. When a given time (for example, three seconds) has elapsed after the driver switches on the turn-signal switch 28, the driver operates the steering wheel to start a lane change to the front of the approaching vehicle F.

If it is determined that the approaching vehicle F is close to the vehicle M, the process proceeds to step S14 in which the turn-signal-lamp standing-by process is performed in the same manner as in step S9, and the process proceeds to step S15. In one embodiment of the disclosure, the process in step S14 corresponds to the standby-state processor.

When the driver is to make a lane change by operating the steering wheel, the driver recognizes an image which indicates the standby state and which is displayed on the HMI monitor 35. This causes the driver not to make a risky lane change to the front of the approaching vehicle F, and to wait for the approaching vehicle F to pass. In addition, the driver of the approaching vehicle F does not feel anxiety, for a collision, which is generated by sudden lighting of the turn-signal lamps 31.

In step S15, the standby-state end determination process is performed in the same manner as in step S10, and the process proceeds to step S16. In step S16, it is determined whether the standby state has been ended by determining whether the standby-state end condition has been satisfied. If the standby-state end condition has not been satisfied, the process returns to step S14. If the standby-state end condition has been satisfied, it is determined that the standby state is ended, and the process proceeds to step S12. In one embodiment of the disclosure, the process in steps S15 and S16 corresponds to the standby-state end determination processor.

In step S12, the turn-signal lamps 31 are turned on, and the routine ends. The driver recognizes that the turn-signal lamps 31 have been turned on. Thus, the driver easily grasps the lane change timing.

Thus, according to the present embodiment, the driver switches on the turn-signal switch 28 to indicate the driver's intention to make a lane change, and the driving support control unit 11 is going to make a lane change using the ALC control. At that time, if it is determined that a lane change to the front of the approaching vehicle F, which travels on the lane to which a course change is to be made, is difficult to make, the turn-signal lamps 31 are turned off. Thus, the driver of the approaching vehicle F does not feel anxiety, for a collision, which is generated by sudden lighting of the turn-signal lamps 31. The driver of the approaching vehicle F is not to be in panic.

The driver of the vehicle M is informed of the standby state, in which the turn-signal lamps 31 are turned off, for example, by using the HMI monitor 35. Thus, the driver of the vehicle M does not mistakenly believe that the ALC control is canceled due to the approaching vehicle F which is close to the vehicle M. In addition, the driver of the vehicle M is not annoyed even when the turn-signal lamps 31 are turned on after the standby state ends.

The present disclosure is not limited to the embodiment described above. For example, the turn signal display process illustrated in FIGS. 3 and 4 is not limited to the case of a lane change from a cruising lane to a passing lane, and is also applied to the case of a lane change from a passing lane back to a cruising lane.

According to the present disclosure, assume the case where the rear side detector detects an approaching vehicle when the turn-signal switch is switched on. In this case, if it is determined that the approaching vehicle is close to the vehicle based on the relationship between the vehicle and the approaching vehicle, turn-signal lamps are made to enter the standby state, and the driver of the vehicle is informed of the standby state. Thus, in the case where an approaching vehicle is detected on the lane, to which the vehicle is to make a course change, when the vehicle is to make the course change, turn-signal lamps are in the off state. Thus, the driver of the approaching vehicle is not to be in panic due to sudden lighting of the turn-signal lamps. When the turn-signal lamps are in the standby state, the driver of the vehicle is informed of the standby state. Thus, the driver of the vehicle is not annoyed.

The driving support control unit 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving support control unit 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle driving support device to be applied to a vehicle, the vehicle driving support device comprising:
   a turn-signal switch that is to be switched on by a driver who drives the vehicle, in a case where a course of the vehicle is to be changed;
   a rear side detector configured to detect an approaching vehicle traveling on a lane to which the course of the vehicle is to be changed;
   turn-signal lamps to be disposed respectively on right and left sides of the vehicle in a width direction of the vehicle, one of the turn-signal lamps on a side of the lane being to be turned on in the case where the course of the vehicle is to be changed; and
   a turn-signal display processor configured to perform display processing regarding the one of the turn-signal lamps in response to the turn-signal switch being switched on,
   wherein the turn-signal display processor comprises
      a closeness determiner configured to determine whether the approaching vehicle is close to the vehicle based on a relationship between the vehicle and the approaching vehicle, in a case where the rear side detector detects the approaching vehicle when the turn-signal switch is switched on,
      a standby-state processor configured to, in a case where the closeness determiner determines that the approaching vehicle is close to the vehicle, cause the one of the turn-signal lamps to be a standby state in which turning the one of the turn-signal lamps on is prohibited, and inform the driver of the standby state, and
      a standby-state end determination processor configured to end the standby state in a case where the approaching vehicle reaches a side-by-side position of the vehicle, and turn on the one of the turn-signal lamps.

2. The vehicle driving support device according to claim 1,
   wherein the standby-state end determination processor is configured to end the standby state in a case where an intentional operation of the driver is detected before the approaching vehicle reaches the side-by-side position of the vehicle.

3. The vehicle driving support device according to claim 2,
   wherein the intentional operation comprises one of:
      activation of a sub-switch other than the turn-signal switch,
      in a case the turn-signal switch is a momentary switch, switch of the turn-signal switch on again towards the lane to which the course of the vehicle is to be changed,
      operation of a steering wheel of the vehicle towards the lane to which the course of the vehicle is to be changed, and
      acceleration of the vehicle.

4. A vehicle driving support device to be applied to a vehicle, the vehicle driving support device comprising:
   a turn-signal switch that is to be switched on by a driver who drives the vehicle, in a case where a course of the vehicle is to be changed;
   a rear side sensor configured to detect an approaching vehicle traveling on a lane to which the course of the vehicle is to be changed;
   turn-signal lamps to be disposed respectively on right and left sides of the vehicle in a width direction of the vehicle, one of the turn-signal lamps on a side of the lane being to be turned on in the case where the course of the vehicle is to be changed; and circuitry configured to perform display processing regarding the one of the turn-signal lamps in response to the turn-signal switch being switched on, wherein the circuitry is configured to determine whether the approaching vehicle is close to the vehicle based on a relationship between the vehicle and the approaching vehicle, in a case where the rear side sensor detects the approaching vehicle when the turn-signal switch is switched on, upon determining that the approaching vehicle is close to the vehicle, cause the one of the turn-signal lamps to be a standby state in which turning the one of the turn-signal lamps on is prohibited, and inform the driver of the standby state, and end the standby state in a case where the approaching vehicle reaches a side-by-side position of the vehicle, and turn on the one of the turn-signal lamps.

5. The vehicle driving support device according to claim 4, wherein the circuitry is configured to end the standby state in a case where an intentional operation of the driver is detected before the approaching vehicle reaches the side-by-side position of the vehicle.

6. The vehicle driving support device according to claim 5, wherein the intentional operation comprises one of:

activation of a sub-switch other than the turn-signal switch, in a case the turn-signal switch is a momentary switch, switch of the turn-signal switch on again towards the lane to which the course of the vehicle is to be changed, operation of a steering wheel of the vehicle towards the lane to which the course of the vehicle is to be changed, and acceleration of the vehicle.

* * * * *